(12) United States Patent
Zaouter et al.

(10) Patent No.: US 12,271,097 B2
(45) Date of Patent: Apr. 8, 2025

(54) SYSTEM AND METHOD FOR COMPRESSING SHORT OR ULTRA-SHORT LIGHT PULSES, AND ASSOCIATED LIGHT-PULSED LASER SYSTEM

(71) Applicants: AMPLITUDE SYSTEMES, Pessac (FR); CENTRE NATIONAL DE LA RECHERCHE SCIENTIFIQUE, Paris (FR)

(72) Inventors: Yoann Zaouter, Boulogne-Billancourt (FR); Florent Guichard, Paris (FR); Loïc Lavenu, Bourg-la-Reine (FR); Marc Hanna, Limours (FR)

(73) Assignees: AMPLITUDE, Pessac (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 892 days.

(21) Appl. No.: 17/284,397

(22) PCT Filed: Oct. 9, 2019

(86) PCT No.: PCT/FR2019/052393
§ 371 (c)(1),
(2) Date: Apr. 9, 2021

(87) PCT Pub. No.: WO2020/074827
PCT Pub. Date: Apr. 16, 2020

(65) Prior Publication Data
US 2021/0333683 A1    Oct. 28, 2021

(30) Foreign Application Priority Data
Oct. 10, 2018 (FR) .................................... 1859397

(51) Int. Cl.
*G02F 1/35* (2006.01)

(52) U.S. Cl.
CPC .............. *G02F 1/35* (2013.01); *G02F 1/3503* (2021.01); *G02F 1/3507* (2021.01); *G02F 1/3515* (2013.01)

(58) Field of Classification Search
CPC ...... G02F 1/3532; G02F 1/353; G02F 1/3515; G02F 1/3503; G02F 1/3507; G02F 1/35
See application file for complete search history.

(56) References Cited

U.S. PATENT DOCUMENTS 5,956,173 A    9/1999  Svelto et al.
9,219,344 B2   12/2015 Zhang et al.
(Continued)

OTHER PUBLICATIONS

International Search Report for PCT/FR2019/052393 dated May 4, 2020, 6 pages.
(Continued)

*Primary Examiner* — Sharrief I Broome
*Assistant Examiner* — Journey F Sumlar
(74) *Attorney, Agent, or Firm* — NIXON & VANDERHYE

(57) ABSTRACT

Disclosed is a system for compressing short or ultra-short light pulses emitted by a light source. The compression system includes: —a first non-linear light pulse compression module including a multi-pass cell, the multi-pass cell including a first non-linear optical medium; and —a second non-linear light pulse compression module including a capillary filled with a gaseous second non-linear optical medium, and a compressor arranged at the output of the capillary, the first non-linear compression module and the second non-linear compression module being arranged in series on the path of a source light beam of source light pulses. Also disclosed is a light-pulses laser system and to a method for compressing short or ultra-short light pulses.

11 Claims, 1 Drawing Sheet

(56) References Cited

U.S. PATENT DOCUMENTS

2012/0002269 A1  1/2012  Tempea
2017/0125964 A1  5/2017  Russbueldt et al.

OTHER PUBLICATIONS

Written Opinion of the ISA for PCT/FR2019/052393 dated May 4, 2020, 6 pages.

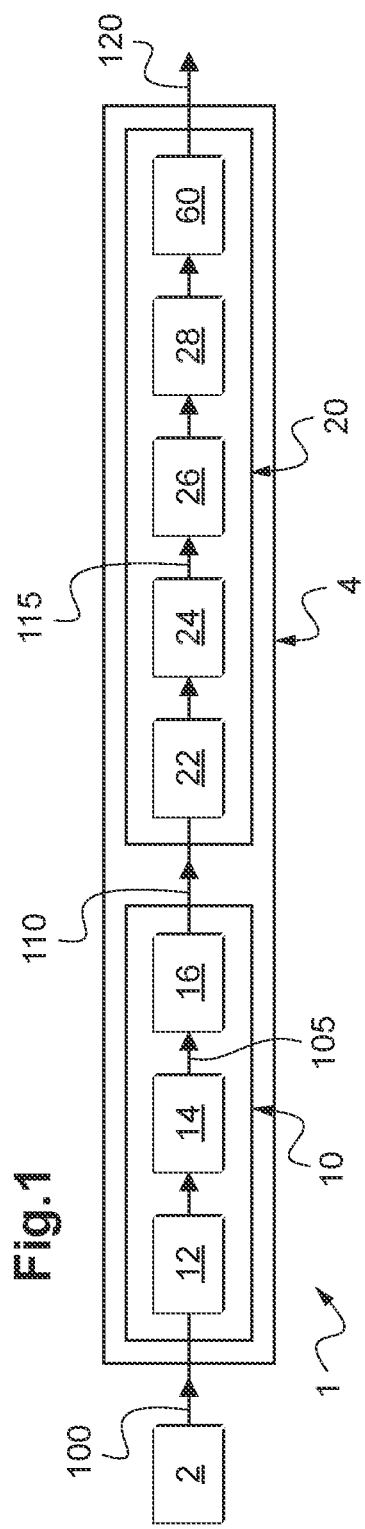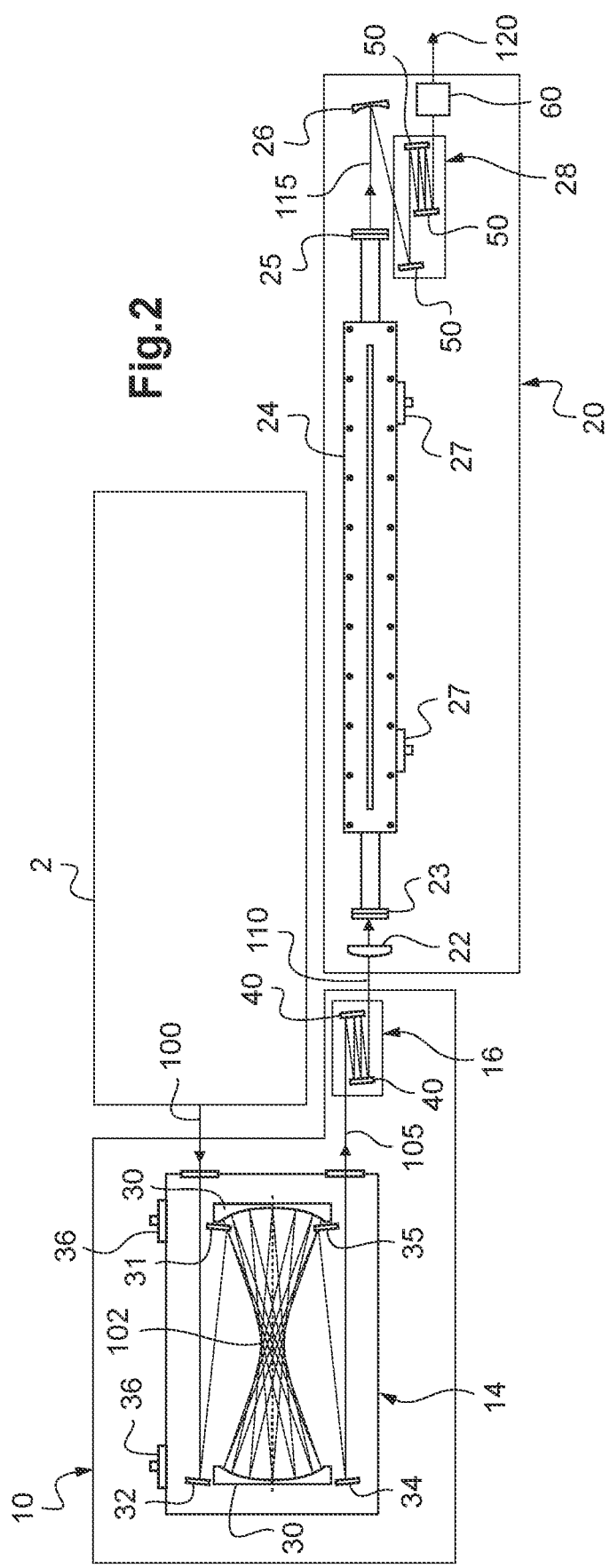

SYSTEM AND METHOD FOR COMPRESSING SHORT OR ULTRA-SHORT LIGHT PULSES, AND ASSOCIATED LIGHT-PULSED LASER SYSTEM

CROSS-REFERENCE TO RELATED APPLICATIONS

This application is the U.S. national phase of International Application No. PCT/FR2019/052393 filed Oct. 9, 2019 which designated the U.S. and claims priority to FR 1859397 filed Oct. 10, 2018, the entire contents of each of which are hereby incorporated by reference.

TECHNICAL FIELD TO WHICH THE INVENTION RELATES

The present invention generally relates to the field of laser systems for generating high power and/or high energy ultra-short light pulses.

In particular, it relates to the field of light pulse compression systems, or light pulse compressors, to temporally compress light pulses.

More particularly, it relates to a system and a method for compressing short or ultra-short light pulses.

It also relates to a laser system comprising a light pulse compression system.

TECHNOLOGICAL BACK-GROUND

The use of non-linear compression systems is a method regularly used to reduce the duration of light pulses, generally after temporal dispersion and amplification. Many non-linear compression systems are known, which are essentially based on the self-phase modulation (SPM) spectral broadening of the incident light pulses in a solid or gaseous medium having non-linear optical properties.

A known compression system consists in using a solid-core fibre. The efficiency of transmission of this device is generally of the order of 80% but the incident energy of the light pulses is limited to a few microjoules (µJ).

Another compression system consists in using a hollow fibre filled with a gas. The hollow fibre acts as a waveguide whose structure makes it possible to ensure a guiding of the light pulses with low losses (and ideally without loss). For that purpose, the hollow fibre cladding is micro-structured so as to be provided with these guiding properties. The transmission efficiency of this device is hence very high, typically of the order of 90%, at energies of several tens of microjoules. However, these hollow fibres are limited as regards the robustness of the laser parameters (for example, the pointing stability) or the preservation of the incident polarization.

Still another compression system consists in using plates of material. These plates of material comprise all the types of materials transparent to the wavelength emitted by the source. It is for example fused silica, yttrium-aluminium garnet crystal (YAG crystal), calcium fluoride ($CaF_2$) or potassium titanyl phosphate (KTP). This device makes it possible to obtain strong transmissions, but the compression factor must be limited (typically lower than 5) in order to preserve the spatial and spatio-temporal quality of the light beam.

Still another compression system consists in using a capillary filled with gas. Strong compression coefficients are obtained (typically higher than 10) with high-energy pulses (for example, more than 1 mJ). However, a capillary filled with gas does not act as a waveguide, the propagation of the light pulses hence occurs without loss. Thus, to limit the losses of this device, a compromise must be found between the length and the diameter of the capillary used.

Another compression system finally consists in using a multi-pass cell, containing a gas or a solid element having non-linear optical properties, in which the light beam makes a number of round trips. This device makes it possible to obtain compression factors lower than 10 by ensuring a strong transmission efficiency, typically higher than 90%. Moreover, the spatial quality of the light beam is preserved. However, the optical properties of the mirrors used for the cell limit the performances of this device.

Finally, none of the known compression systems allows obtaining short or ultra-short light pulses, such as a light pulse of a few optical cycles, for example lower than 10 optical cycles, with both a great efficiency (typically higher than 50%) and a high compression rate (typically comprised between 10 and 400).

OBJECT OF THE INVENTION

In order to remedy the above-mentioned drawback of the state of the art, the present invention proposes a system for compressing short or ultra-short light pulses.

More particularly, it is proposed according to the invention a system for compressing short or ultra-short light pulses emitted by a light source. According to the invention, the compression system comprises:

a first non-linear light pulse compression module comprising a multi-pass cell, the multi-pass cell comprising a first non-linear optical medium, and a second non-linear light pulse compression module comprising a capillary filled with a second gaseous non-linear optical medium and a compressor arranged at the output of the capillary, the first non-linear compression module and the second non-linear compression module being arranged in series on the path of a source light beam of source light pulses, the first non-linear compression module being arranged upstream of the second non-linear compression module.

Advantageously, the use of a first compression module comprising a multi-pass cell and a second compression module comprising a capillary makes it possible to obtain a strong energy transmission of the short or ultra-short light pulses (liable to have a duration lower than or equal to a few optical cycles). The mean power transmitted at the output of the compression system is very high for these light pulse durations. Moreover, the configuration of the invention provides a great stability of the light beam in a compact compression system.

The combination of this first compression module and of this second compression module allows obtaining an energy efficiency higher than 50% without however exhibiting temporal or spatio-spectral degradations.

Other non-limitative and advantageously features of the system for compressing short or ultra-short light pulses according to the invention, taken individually or according to all the technically possible combinations, are the following:

the first non-linear compression module comprises another compressor arranged at the output of the multi-pass cell;

the multi-pass cell comprises at least two mirrors, an area of propagation of the source light beam being defined between the two mirrors;

the two mirrors are dispersive and the multi-pass cell introduces a negative dispersion;

the first non-linear optical medium of the multi-pass cell comprises a fluid medium having non-linear optical properties;

the first non-linear optical medium of the multi-pass cell comprises a solid non-linear optical element;

the first non-linear compression module comprises a first focusing optical system for focusing the source light beam, the first focusing optical system being arranged at the input of said first non-linear compression module, the first focusing optical system being designed to couple a propagation mode to the size of the source light beam in an area of focusing of the multi-pass cell;

the second non-linear compression module comprises a second focusing optical system, the second focusing optical system being arranged at the input of said second non-linear compression module, the second focusing optical system being designed to focus a first compressed light beam emerging from the first non-linear compression module to the input of the capillary;

the second non-linear compression module comprises an optical device for adjusting the dispersion of a second compressed light beam, said optical device being arranged at the output of the second non-linear light beam compression module;

the other compressor comprises at least one dispersive mirror and/or a diffraction grating and/or a prism and/or a Gires-Tournoi interferometer, and the compressor comprises at least one dispersive mirror and/or a diffraction grating and/or a prism and/or a Gires-Tournoi interferometer; and a first factor of temporal compression of the light pulses at the output of the first non-linear compression module is higher than 1 and lower than or equal to 20, preferably between 5 and 20, and a second factor of temporal compression of the light pulses at the output of the second non-linear compression module is higher than 1 and lower than or equal to 20, preferably between 5 and 20.

Advantageously, the combination of this first compression module and of this second compression module makes it possible to obtain a whole temporal compression factor higher than 10 and liable to reach 400.

The invention also proposes a light pulse laser system comprising:

a light source designed to generate short or ultra-short light pulses, and a light pulse compression system as defined hereinabove.

The invention also proposes a method for temporally compressing short or ultra-short light pulses emitted by a light source.

According to the invention, the method includes successively:

a first step of non-linear light pulse compression by a first non-linear light pulse compression module, said first module comprising a multi-pass cell, the multi-pass cell comprising a first non-linear optical medium, and a second step of non-linear light pulse compression by a second non-linear light pulse compression module, said second module comprising a capillary filled with a second gaseous non-linear optical medium and a compressor arranged at the output of the capillary, the first non-linear compression module and the second non-linear compression module being arranged in series on the path of a source light beam of source light pulses, the first non-linear compression module being arranged upstream of the second non-linear compression module.

DETAILED DESCRIPTION OF AN EXEMPLARY EMBODIMENT

The following description in relation with the appended drawings, given by way of non-limitative examples, will allow a good understanding of what the invention consists of and of how it can be implemented.

In the appended drawings:

FIG. 1 proposes a schematic representation of the different elements of a laser system according to the invention; and FIG. 2 proposes another schematic representation of the different elements of a laser system according to the invention.

FIG. 1 proposes a first schematic representation of the different elements of a light pulse laser system 1 according to an exemplary embodiment. FIG. 2 proposes another schematic representation of the different elements of a light pulse laser system according to the invention. The common elements of these two figures are described simultaneously hereinafter.

The light pulse laser system 1 comprises a light source 2 and a light pulse compression system 4.

The light source 2 is designed to generate short or ultrashort light pulses. In the present document, it is meant by "short or ultrashort light pulses", light pulses whose duration is comprised between a few femtoseconds (fs) and 100 ps. The duration of the light pulses emitted by the light source 2 is for example comprised between 200 fs and 400 fs. The light source 2 here has a central wavelength of the order of 1030 nanometres (nm), with a mid-height spectral width of the order of 7 nm. As an alternative, the central wavelength of the light source can be in the visible range or the near-infrared range or also the mean-infrared range.

In practice here, the light source 2 generates high-energy light pulses. In the present document, it is meant by "high-energy light pulses", light pulses whose energy is higher than 10 µJ, for example comprised between 10 µJ and 500 mJ. The high-energy light pulses have for example here energies between 100 µJ and 1 mJ. In practice, the light source 2 is for example a Tangerine laser source, doped Ytterbium fibre laser and an amplifier, of the company Amplitude Systèmes. In this case, the light source 2 generates pulses having a duration of the order of 330 fs and an energy of the order of 225 µJ per light pulse with a repetition frequency of the order of 150 kHz. The corresponding mean power is then of the order of 34 W.

A source light beam 100 is formed from pulses generated at the output of the light source 2. In practice, the quality factor $M^2$ of the source light beam 100 at the output of the light source 2 is lower than 2. The quality factor $M^2$ of the source light beam 100 at the output of the light source 2 is for example equal to 1.4×1.2.

As can be seen in FIGS. 1 and 2, the source light beam 100 is then directed towards the light pulse compression system 4, also called compression system 4 hereinafter.

The compression system 4 comprises a first non-linear light pulse compression module 10, also called first compression module 10 hereinafter, and a second non-linear light pulse compression module 20, also called hereinafter second compression module 20.

The first non-linear compression module 10 comprises a first focusing optical system 12 of the source light beam 100, a multi-pass cell 14. In the example illustrated, the first non-linear compression module 10 further comprises a first compressor 16. The first compressor 16 is also called other compressor in the present document.

The first focusing optical system 12 is arranged at the input of the first compression module 10. The first focusing optical system 12 is positioned upstream of the multi-pass cell 14, in the first non-linear compression module 10. In this description, the terms "upstream" and "downstream" are used according to the direction of propagation of the light beam, from the generation of the source light beam 100 in the light source 2 to the output of the laser system 1.

The first focusing optical system 12 is designed to direct the source light beam 100 towards the input of the multi-pass cell 14. In particular, the first focusing optical system 12 is designed to couple a propagation mode to the size (also called "waist") of the source light beam 100 in an area of focusing of the multi-pass cell 14. In practice, the first focusing optical system 12 comprises for example a three-lens arrangement.

The multi-pass cell 14 comprises at least two mirrors 30. In practice, the two mirrors 30 are concave. The dispersion induced by the two mirrors 30 is zero in practice, of same sign or opposite sign with respect to the dispersion of a first non-linear optical medium arranged in the multi-pass cell 14 (and described hereinafter). For example, the mirrors 30 have a diameter of about 5 cm and a radius of curvature of about 300 mm. The two mirrors 30 are arranged opposite to each other and spaced apart by a distance lower than twice the radius of curvature of the mirrors 30. In practice, the multi-pass cell 14 is for example formed by two concave mirrors spaced apart by about 450 mm. An area of propagation of the light beam 102 propagating in the multi-pass cell 14 is defined between the two mirrors 30.

The multi-pass cell 14 also comprises at least one optical element 31 for the introduction of the source light beam 100 into the propagation area. The introduction optical element 31 is arranged at the input of the multi-pass cell 14. The introduction optical element 31 is designed to orient the source light beam 100 towards the mirrors 30. As can be seen in FIG. 2, the multi-pass cell 14 also comprises in option a deflection mirror 32 designed to reduce the bulk of the multi-pass cell 14.

In practice, the introduction optical element 31 comprises a planar mirror, for example a rectangular planar mirror of size 3 mm×10 mm.

Symmetrically, the multi-pass cell 14 comprises at least one extraction optical element 35 for the extraction of the light beam 102 from the area of propagation between the two mirrors 30. The extraction optical element 35 is arranged at the output of the multi-pass cell 14, downstream of the mirrors 30. The extraction optical element 35 is designed to extract a light beam 105 emerging from the multi-pass cell 14, and emerging in particular from the propagation area, and to direct it towards the output of the multi-pass cell 14. As can be seen in FIG. 2, the multi-pass cell 14 further optionally comprises another deflection mirror 34.

In practice, the extraction optical element 35 comprises a planar mirror, for example a rectangular planar mirror of size 3 mm×10 mm.

The introduction 31 and extraction 35 optical elements are coupled in such a way as to allow the light beam 105 to travel a predetermined distance between the two mirrors 30, in the propagation area. For example, here, the light beam 105 travels a total distance of propagation of about 24 m, corresponding to about 27 round-trips in the area of propagation between the two mirrors 30.

The multi-pass cell 14 comprises a first non-linear optical medium. This first non-linear optical medium favours the obtaining of a non-linear susceptibility of order 3 that is necessary for the self-phase modulation. The interaction of the light pulses with this first non-linear medium allows a spectral broadening of these light pulses.

In practice, the first non-linear optical medium extends over the totality of the distance observed between the two mirrors 30. As an alternative, the first non-linear optical medium can cover a fraction of the distance between the two mirrors 30.

The first non-linear optical medium is for example a fluid medium. By fluid medium, it is meant a gaseous medium or a liquid medium. This fluid medium has non-linear optical properties.

For example, the first non-linear optical medium is a gaseous medium. The gas is for example argon, with a pressure of 5 bars. As an alternative, the gaseous medium comprises for example any rare gas, such as xenon, krypton, neon or helium, or any molecular gas, for example air. The multi-pass cell 14 then comprises at least one gas transfer element 36. The gas transfer element 36 allows the injection and/or extraction of the gas to and/or from the multi-pass cell 14.

As an alternative, the multi-pass cell can be the seat of a gas flow, propagating thanks to the transfer elements 36. As another alternative, the multi-pass cell 14 can be under a static gas pressure, this pressure can be lower or higher than the atmospheric pressure, for example lower than 20 bars.

As still another alternative, the first non-linear optical medium can be a liquid medium having non-linear optical properties. In practice, the liquid medium can comprise any type of liquid, for example water, acetone or methanol.

As still another alternative, the first non-linear optical medium can be a solid non-linear optical element arranged in the area of propagation between the two mirrors 30. The solid non-linear optical element is for example consisted of fused silica or sapphire or yttrium-aluminium garnet (YAG crystal).

As still another alternative, the first non-linear medium can comprise a combination of a solid non-linear optical element, partially covering the distance between the two mirrors 30, and a fluid medium.

In the exemplary embodiment shown in FIGS. 1 and 2, the first compressor 16 is arranged at the output of the first compression module 10. The first compressor 16 is located downstream of the multi-pass cell 14 in the first compression module 10.

The generation of ultra-short pulses in such a compression system requires an accurate control of the dispersive effects accumulated in the multi-pass cell 14, in particular in the case of a spectrum supporting a pulse of a few optical cycles, for example lower than 10 optical cycles.

The first compressor 16 is designed to temporally compress the light pulses of the light beam 105 emerging from the multi-pass cell 14. The compression implemented in the first compressor 16 is linear. For example (FIG. 2), the first compressor 16 comprises two dispersive mirrors 40, introducing for example a total group delay dispersion of the order of −4900 fs². As an alternative, the first compressor 16 can include a single dispersive mirror. As an alternative, the first compressor 16 comprises for example a Gires-Tournoi interferometer (GTI) or so-called "chirped" dispersive mirrors.

As an alternative, the first compressor 16 can include one or several diffraction grating(s) and/or one or several prism (s). As still another variant, the first compressor 16 can include a combination of a diffraction grating and prisms.

As still another alternative, the mirrors of the multi-pass cell 14 are dispersive mirrors, for example mirrors of the Gires-Tournoi interferometer (GTI) or so-called "chirped" mirrors type, so that the multi-pass cell, comprising the mirrors 30 and the first non-linear optical medium, has a negative net dispersion. In this case, the multi-pass cell then simultaneously applies a spectral broadening and a first temporal compression to the light pulses. A self-compression phenomenon then occurs in the multi-pass cell 14. As an alternative, in this case, the first non-linear compression module 10 may not comprise a first compressor 16, the compression occurring only in the multi-pass cell 14.

As introduced hereinabove, the compression device 4 also comprises the second compression module 20. This second compression module 20 is arranged in series with the first compression module 10 on the path of the light beam. The second compression module 20 is arranged downstream of the first compression module 10, which has been previously introduced.

The second compression module 20 comprises a second focusing optical system 22, a capillary 24, a collimating optical system 26, a second compressor 28 and an optical device 60 for adjusting the dispersion of the light beam. The second compressor 28 is also called compressor in the present document.

The second focusing optical system 22 is arranged at the input of the second compression module 20. The second focusing optical system 22 is positioned upstream of the capillary 24 in the second compression module 20. This second focusing optical system 22 is designed to focus a first compressed light beam 110 emerging from the first compression module 10 to the input of the capillary 24. In an exemplary embodiment, this second focusing optical system 22 ensures the pointing stability of the first compressed light beam 110 and makes it possible to obtain a stability of the light pulse in the short and long terms. In practice, the second focusing optical system 22 comprises a lens, for example of focal distance of the order of f=400 mm.

The first compressed light beam 110 then propagates in the capillary 24. The capillary 24 extends over a predetermined length, for example of the order of one metre. The capillary 24 has a diameter between 50 µm and 10 mm, for example of the order of 400 µm. The capillary 24 comprises a second non-linear optical medium. This second non-linear optical medium favours the obtaining of a non-linear susceptibility of order 3 that is necessary to the self-phase modulation. The interaction of the light pulses with this second non-linear medium allows a spectral broadening of these light pulses.

This second non-linear optical medium is gaseous. This gaseous medium comprises for example any rare gas, such as argon, xenon, krypton, neon or helium, or any molecular gas, for example air or dinitrogen. For example here, the capillary 24 is filled with xenon at a pressure of 500 mbar. As an alternative, it may be the same gas as that present in the multi-pass cell 14. The capillary 24 also comprises at least another gas transfer element 27. The other gas transfer element 27 allows the injection and/or the extraction of the gas into and/or from the capillary 24.

As an alternative, the capillary 24 can be the seat of a gas flow, propagating thanks to the other transfer elements 27. In this case, the capillary 24 is under a differential gas pressure. This differential pressure is obtained in the capillary by injecting and extracting the gas through the other transfer elements 27.

As another alternative, the capillary 24 can be under a static gas pressure.

In practice, the capillary 24 comprises for example an input window 23 and an output window 25 through which the light beam respectively enters into and emerges from the capillary 24.

As can be seen in FIGS. 1 and 2, the second compression module 20 also comprises the collimating optical system 26. The collimating optical system 26 is arranged downstream of the capillary 24 on the path of a light beam 115 emerging from the capillary 24. This collimating optical system 26 is designed to collimate the light beam 115 emerging from the capillary 24. In practice, the collimating optical system 26 is a lens or an off-axis parabolic mirror or a spherical mirror. For example, the collimating optical system 26 may be a spherical mirror of diameter of the order of 10 mm and/or of radius of curvature of the order of 800 mm.

As an alternative, this collimating optical system 26 can be omitted from the second compression module 20.

The second compressor 28 is then arranged at the output of the second compression module 20. The second compressor 28 is positioned downstream of the collimating optical system 26 in the second compression module 20.

The second compressor 28 is designed to temporally compress the light pulses of the light beam 115 emerging from the capillary 24 and the collimating optical system 26. The compression implemented in the second compressor 28 is linear. In the example of FIG. 2, the second compressor 28 comprises at least two dispersive mirrors 50, introducing for example a total group delay dispersion of the order of −300 $fs^2$. As an alternative, the second compressor 28 can comprise a single dispersive mirror. As an alternative, the second compressor 28 comprises a Gires-Tournoi (GTI) interferometer or so-called "chirped" mirrors.

The second compressor 28 receives the light beam 115 emerging from the capillary 24 and generates a compressed light beam 120.

As shown in FIG. 1, the optical device 60 for adjusting the dispersion of the compressed light beam 120 is arranged at the output of the second compression module 20. The dispersion adjustment optical device 60 is positioned downstream of the second compressor 28. The dispersion adjustment optical device 60 is designed to finely adjust the dispersion of the second compressed light beam 120 at the output of the second compression module 20. In practice, the dispersion adjustment optical device 60 comprises two plates of material whose thickness is variable. The insertion of these plates along the propagation of the second compressed light beam 120 makes it possible to introduce a variable quantity of group speed dispersion, this quantity depending on the thickness of material that is passed-through. For example, the dispersion adjustment optical device 60 can comprise at least one prism, preferably a pair of $CaF_2$ prisms. The two prisms of this pair are positioned so as not to introduce an angular dispersion for the second compressed light beam 120.

As an alternative, the dispersion adjustment optical device 60 can be omitted from the second compression module 20.

The light beam laser system 1 described hereinabove makes it possible to implement the following light pulse compression method. This method is particularly adapted for the compression of short or ultra-short light pulses.

According to the method of the invention, the light source 2 generates a plurality of short or ultra-short and high-energy light pulses. As in the example indicated hereinabove, the light source 2 has here a central wavelength of the order of 1030 nm, with a mid-height spectral width of the order of 7 nm. Here, the light source 2 generates light pulses having a duration equal to 330 fs and an energy of the order of 225 µJ per light pulse, with a repetition frequency comprised between 1 Hz and 100 MHz, for example of the order of 150 kHz. The corresponding mean power is then of the order of 34 W.

The method according to the invention makes it possible to obtain, at the output of the laser system 1, pulses of still shorter duration, while maintaining an energy transmission efficiency.

On that subject, the method comprises two successive compression steps: a first non-linear compression step and a second non-linear compression step.

The first non-linear compression step is executed in the first non-linear compression module 10. The source light beam 100 formed from light pulses generated by the light source 2 is directed by the first focusing optical system 12 towards the multi-pass cell 14.

The source light beam 100 is then introduced into the area of propagation between the two mirrors 30 of the multi-pass cell 14 thanks to the introduction 31 and deflection 32 optical elements.

As described hereinabove, the light beam 102 makes a determined number of round-trips, here 27, in the area of propagation that contains the argon gas between the two mirrors 30. The pressure of the gas is further adjusted in order to obtain a desired spectral broadening by non-linear optical effect. The extraction 35 and deflection 34 optical elements then extract the light beam 105 emerging from the multi-pass cell 14 of the area of propagation to direct it towards the output of the multi-pass cell 14. The multi-pass cell 14 allows the spectral broadening of the light beam 105 emerging from the multi-pass cell 14. For example, the spectral width at −10 dB is of the order of 65 nm.

At the output of the multi-pass cell 14, the light pulses of the light beam 105 are temporally compressed in the first compressor 16. Hence, at the output of the first compression module 10, the duration of the light pulses is of the order of 40 fs with a temporal Strehl ratio, characterizing the ratio between the peak power effectively obtained and the peak power that can be reached for an ideal compression (i.e. considering a spectral phase constant over the whole spectrum), of the order of 87%. A first compression factor of this first compression module 10 is then higher than 1, for example between 1 and 20, for example of the order of 8. Generally, the maximum value of the first compression factor depends on the maximum spectral band reflected by the mirrors of the multi-pass cell 14. The transmission of the first compression module 10, taking into account the focusing optical system 12 and the dispersive mirrors of the first compressor 16, is of the order of 85%. At the output of the first compression module 10, the energy of the light pulses is then of the order of 190 µJ, then corresponding to a mean power of about 28.7 W. The quality factor $M^2$ of the first compressed light beam 110 at the output of the first compression module 10 is equal to 1.2×1.2. Hence, the multi-pass cell 14 makes it possible to significantly reduce the pulse duration (in the possible limit defined by the mirrors) while keeping a high energy transmission of the light pulses.

The method according to the invention is then continued with the second step of non-linear compression.

The second step of non-linear compression is performed in the second non-linear compression module 20. At the output of the first non-linear compression module 10, the first compressed light beam 110 is directed towards the second compression module 20. In practice, the second focusing optical system 22 directs the first compressed light beam 110 towards the capillary 24 filled with xenon gas.

The capillary 24 allows the propagation of the light beam coming from high-energy light pulses. The diameter of the capillary 24 is relatively large, preferably of the order of 400 µm, which allows receiving the high-energy light pulses and increasing the transmission of the compression system 4. The capillary 24 allows a guided propagation of the first compressed light beam 110 and the self-phase modulation (SPM) spectral broadening. In particular, the xenon gas contained in the capillary 24 allows a spectral broadening of 800 nm to 1200 nm, with a spectral width at −10 dB of the order of 430 nm.

After propagation in the gas filling the capillary 24, the light beam 115 emerging from the capillary 24 is directed and collimated by the collimating optical system 26 to be thereafter temporally compressed in the second compressor 28. The second compressor 28, comprising for example the dispersive mirrors 50, makes it possible to temporally compress the light beam 115 emerging from the capillary 115 by introducing a negative group speed dispersion. The dispersion can further be finely adjusted at the output of the second compression module 20 thanks to the dispersion adjustment optical device 60.

At the output of the second compression module 20, the duration of the light pulses is of the order of 6 fs with a temporal Strehl ratio of the order of 69%. This duration of light pulses is particularly advantageous, in particular for the energies involved, because it is of a few optical cycles. Here, this duration corresponds to two optical cycles at 1030 nm. The transmission of the second compression module 20, taking into account the second focusing optical system 22 and the dispersive mirrors 50 of the second compressor 28, is of the order of 72%. A second compression factor of this second compression module 20 is then comprised between 2 and 20, for example of the order of 7. At the output of the second compression module 20, the energy of the light pulses is then of the order of 150 µJ, corresponding to a mean power of the order of 23 W. The quality factor $M^2$ of the light beam at the output of the second compression module 20 is equal to 1.2×1.2. The capillary 24 has a very large spectral band, it hence not limits the transmission of the light beam spectrum, contrary to a micro-structured cladding hollow fibre that limits the transmission spectral band by imposing forbidden transmission bands. The capillary 24 makes it possible to obtain a high compression factor and the generation of short or ultra-short pulses of duration lower than or equal to a few optical cycles. Moreover, the capillary 24 makes it possible to provide the output light beam with an excellent spatial quality.

Finally, the factor of temporal compression of the light pulses at the output of the laser system 1 is between 10 and 400. The total transmission of the light pulse compression system 4 is higher than 50%, typically of the order of 61%, with at the output a light pulse duration of the order of 6 fs and an energy of the order of 150 µJ per light pulse with a repetition frequency comprised between 1 Hz and 100 MHz, for example of the order of 150 kHz. The corresponding means power is then of the order of 24 W.

Hence, the combination of a first compression module comprising a multi-pass cell and a second compression module comprising a capillary making it possible to obtain an energy transmission higher than 50% (which is not possible for example using two capillaries), to generate short or ultra-short pulses of a duration lower than or equal to a few optical cycles, whatever the energy of the incident light beam (which is not possible for example with the use of two multi-pass cells or with two hollow-core fibres) and to generate high-energy pulses and/or having a good spatial quality (which is not the case for example with the use of two plates of material or two solid-core fibres).

The laser system 1 as described in the invention finds an advantageous application in the case of systems having a low number of optical cycles per light pulse, typically in the case of very short durations, for example lower than 30 fs. This particularly applies in the case of laser systems comprising sources emitting in the extreme ultraviolet or the X-rays.

The invention claimed is:

1. A system (4) for compressing short or ultra-short light pulses emitted by a light source (2),
wherein said compression system (4) comprises:
a first non-linear light pulse compression module (10) comprising a multi-pass cell (14), the multi-pass cell (14) comprising a first non-linear optical medium, and
a second non-linear light pulse compression module (20) comprising a capillary (24) filled with a second gaseous non-linear optical medium and a compressor (28) arranged at the output of the capillary (24),
the first non-linear compression module (10) and the second non-linear compression module (20) being arranged in series on the path of a source light beam (100) of source light pulses, the first non-linear compression module (10) being arranged upstream of the second non-linear compression module (20),
wherein the multi-pass cell (14) comprises at least two mirrors (30), an area of propagation of the source light beam (100) being defined between the two mirrors (30), and
wherein, the two mirrors (30) being dispersive, the multi-pass cell (14) introduces a negative dispersion.

2. The compression system (4) according to claim 1, wherein the non-linear compression module (10) comprises an other compressor (16) arranged at the output of the multi-pass cell (14).

3. The light pulse compression system (4) according to claim 2, wherein the other compressor (16) comprises at least one dispersive mirror and/or a diffraction grating and/or a prism and/or a Gires-Tournoi interferometer, and wherein the compressor (28) comprises at least one dispersive mirror and/or a diffraction grating and/or a prism and/or a Gires-Tournoi interferometer.

4. The light pulse compression system (4) according to claim 2, wherein the second non-linear compression module (20) comprises an optical device (60) for adjusting the dispersion of a second compressed light beam (120), said optical device (60) being arranged at the output of the second non-linear light beam compression module (20).

5. The light pulse compression system (4) according to claim 2, wherein a first factor of temporal compression of the light pulses at the output of the first non-linear compression module (10) is higher than 1 and lower than or equal to 20, and wherein a second factor of temporal compression of the light pulses at the output of the second non-linear compression module (20) is higher than 1 and lower than or equal to 20.

6. The light pulse compression system (4) according to claim 1, wherein the first non-linear optical medium of the multi-pass cell (14) comprises a solid non-linear optical element.

7. The light pulse compression system (4) according to claim 1, wherein the second non-linear compression module (20) comprises an optical device (60) for adjusting the dispersion of a second compressed light beam (120), said optical device (60) being arranged at the output of the second non-linear light beam compression module (20).

8. A light pulse laser system (1) comprising:
a light source (2) designed to generate short or ultra-short light pulses, and
a light pulse compression system (4) according to claim 1.

9. The light pulse compression system (4) according to claim 1, wherein the first non-linear optical medium of the multi-pass cell (14) comprises a fluid medium having non-linear optical properties.

10. A light pulse compression system (4) for compressing short or ultra-short light pulses emitted by a light source (2),
wherein said compression system (4) comprises:
a first non-linear light pulse compression module (10) comprising a multi-pass cell (14), the multi-pass cell (14) comprising a first non-linear optical medium, and
a second non-linear light pulse compression module (20) comprising a capillary (24) filled with a second gaseous non-linear optical medium and a compressor (28) arranged at the output of the capillary (24),
the first non-linear compression module (10) and the second non-linear compression module (20) being arranged in series on the path of a source light beam (100) of source light pulses, the first non-linear compression module (10) being arranged upstream of the second non-linear compression module (20),
wherein the first non-linear optical medium of the multi-pass cell (14) comprises a fluid medium having non-linear optical properties.

11. A light pulse compression system (4) for compressing short or ultra-short light pulses emitted by a light source (2),
wherein said compression system (4) comprises:
a first non-linear light pulse compression module (10) comprising a multi-pass cell (14), the multi-pass cell (14) comprising a first non-linear optical medium, and
a second non-linear light pulse compression module (20) comprising a capillary (24) filled with a second gaseous non-linear optical medium and a compressor (28) arranged at the output of the capillary (24),
the first non-linear compression module (10) and the second non-linear compression module (20) being arranged in series on the path of a source light beam (100) of source light pulses, the first non-linear compression module (10) being arranged upstream of the second non-linear compression module (20),
wherein a first factor of temporal compression of the light pulses at the output of the first non-linear compression module (10) is higher than 1 and lower than or equal to 20, and wherein a second factor of temporal compression of the light pulses at the output of the second non-linear compression module (20) is higher than 1 and lower than or equal to 20.

* * * * *